Figure 1:
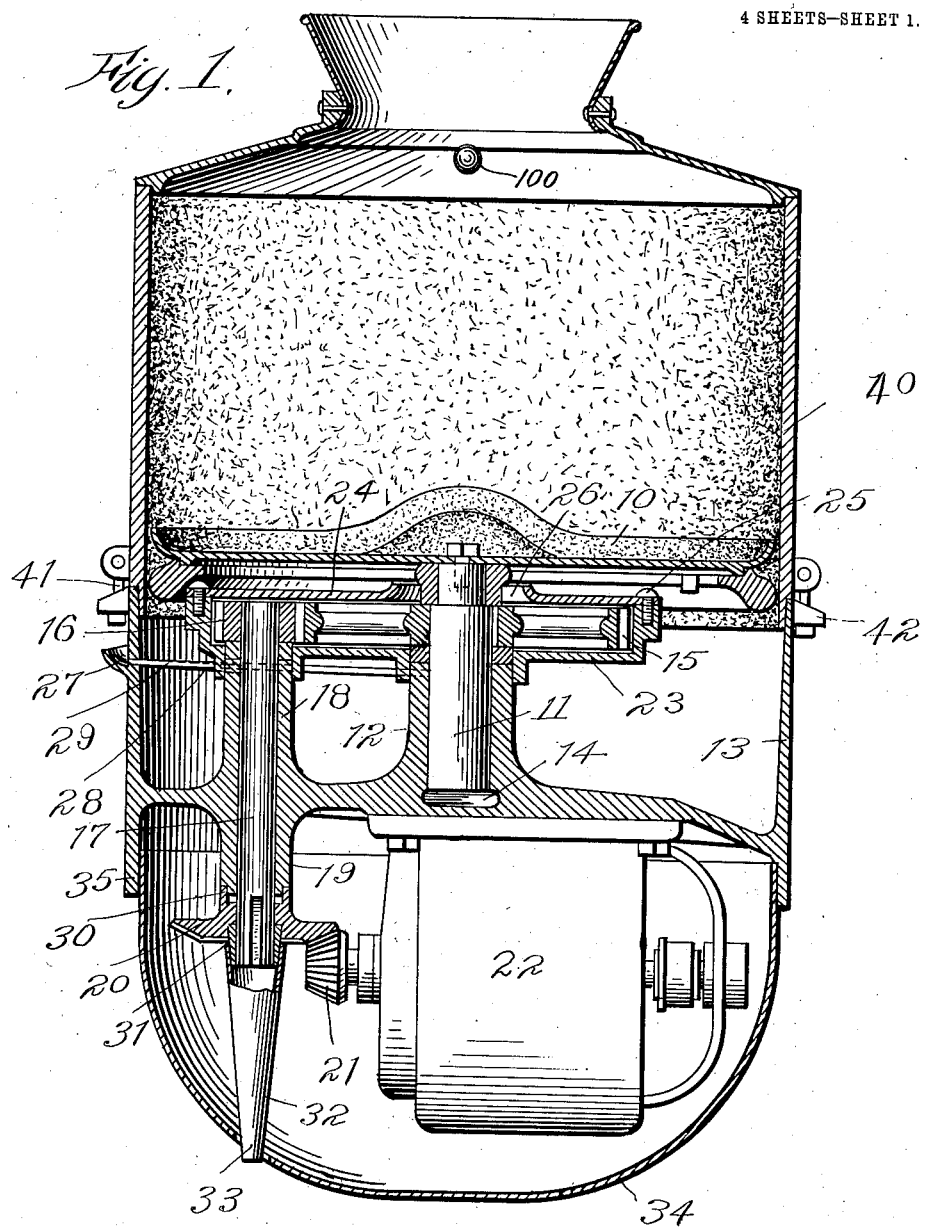

H. ROBINSON.
VEGETABLE PEELING MACHINE.
APPLICATION FILED NOV. 3, 1910.

1,053,319.

Patented Feb. 18, 1913.
4 SHEETS—SHEET 1.

Witnesses:
Katharine Mead
P. F. Crampton

Henry Robinson
Inventor
By his Attorney J. K. MacKaye

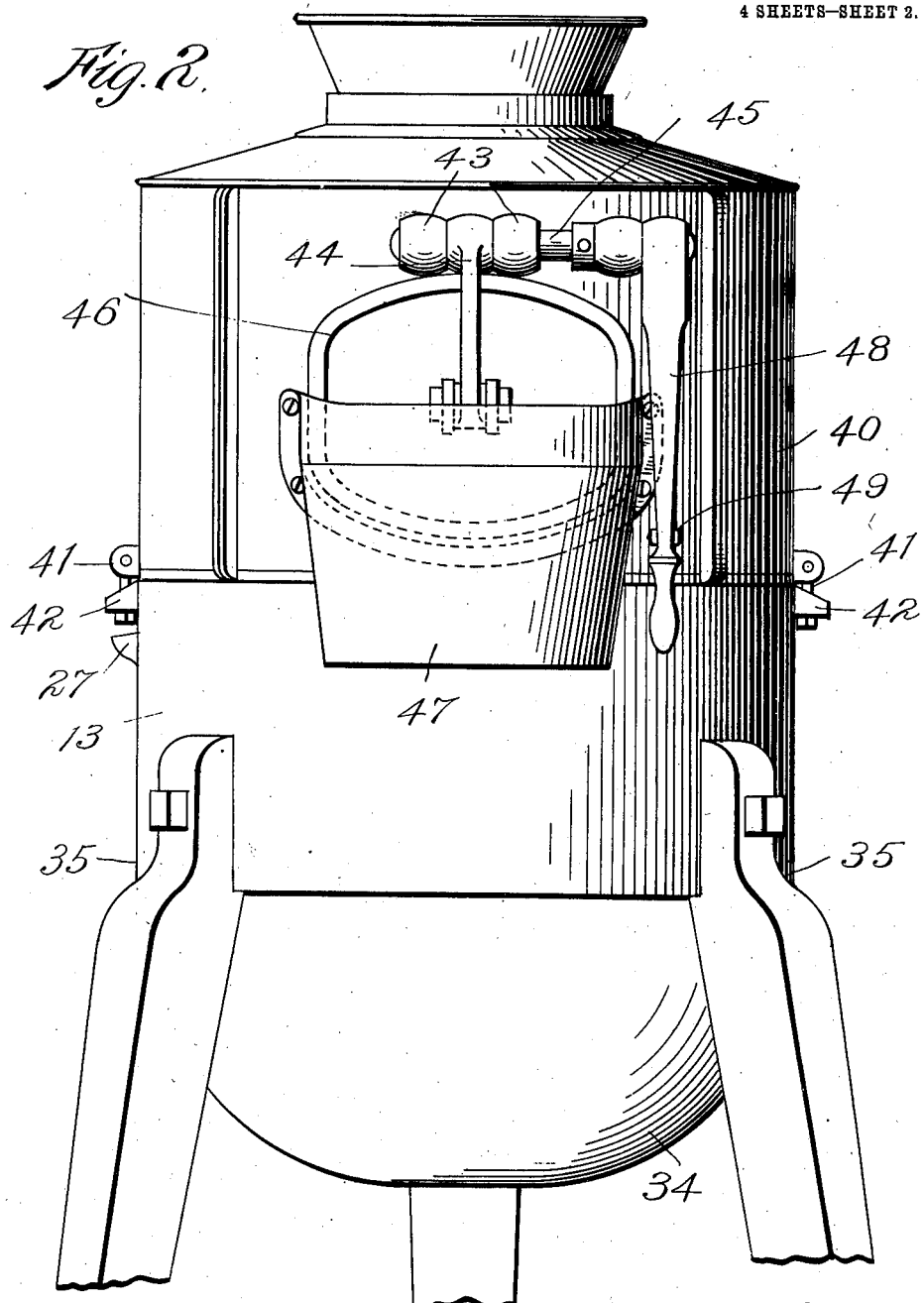

H. ROBINSON.
VEGETABLE PEELING MACHINE.
APPLICATION FILED NOV. 3, 1910.
1,053,319.
Patented Feb. 18, 1913.
4 SHEETS—SHEET 3.
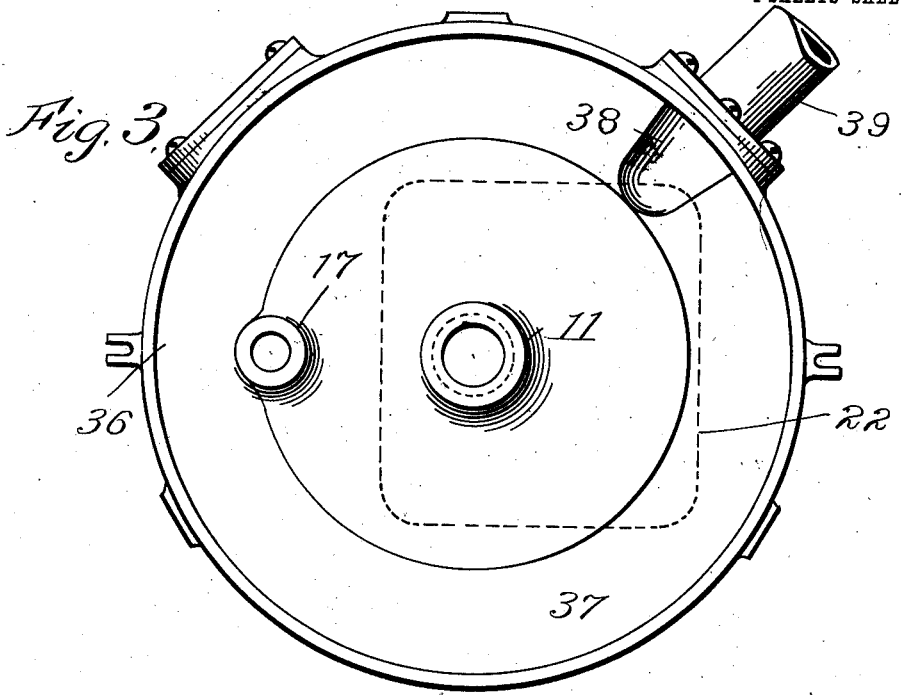
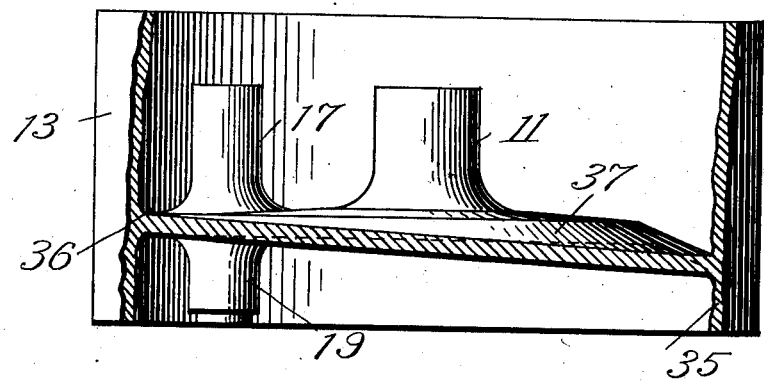

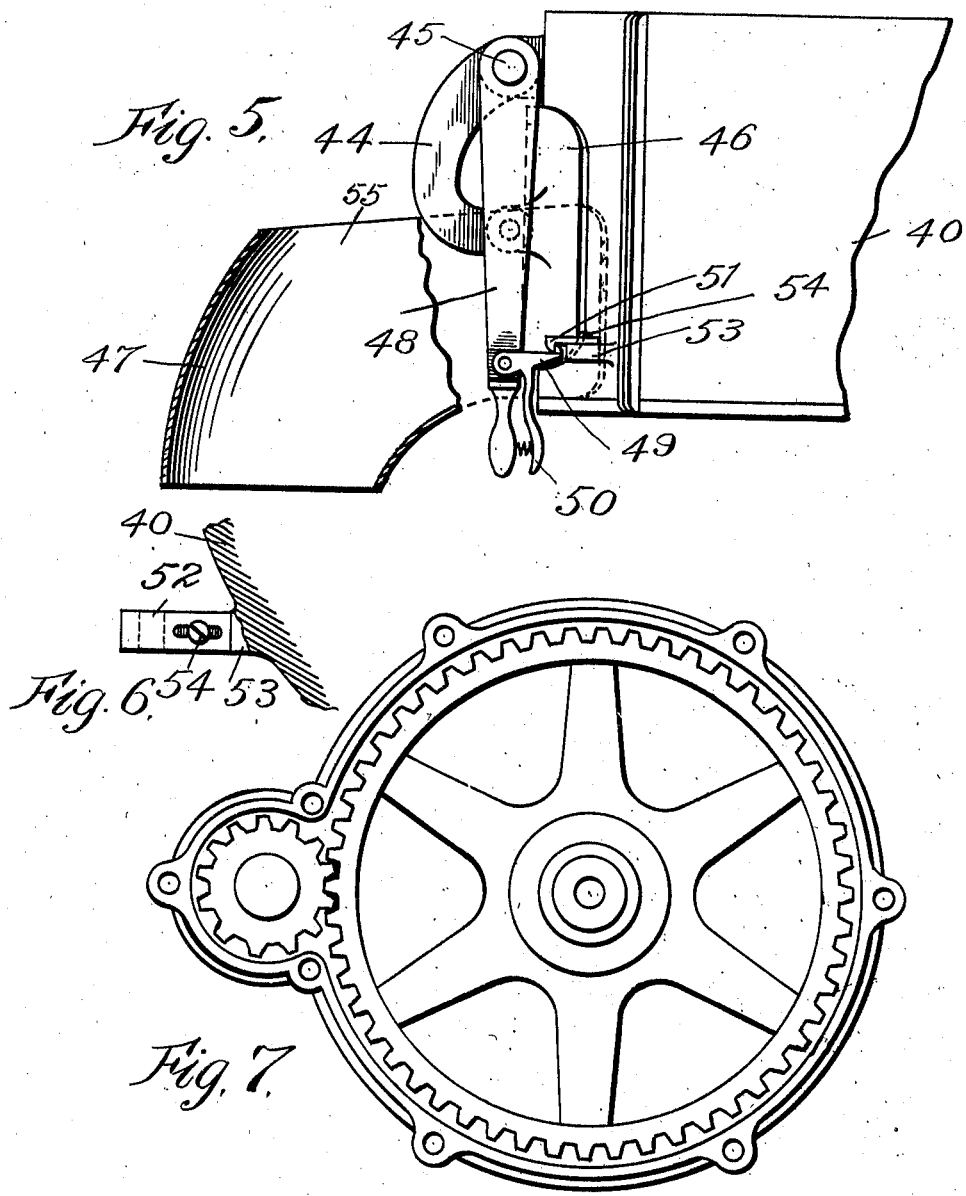

UNITED STATES PATENT OFFICE.

HENRY ROBINSON, OF SOUTH ORANGE, NEW JERSEY.

VEGETABLE-PEELING MACHINE.

1,053,319. Specification of Letters Patent. Patented Feb. 18, 1913.

Application filed November 3, 1910. Serial No. 590,593.

*To all whom it may concern:*

Be it known that I, HENRY ROBINSON, residing in South Orange, in the county of Essex and State of New Jersey, have invented a certain new and useful Improvement in Vegetable-Peeling Machines, of which the following is a specification.

My present invention relates to machines for peeling vegetables and particularly to such as are driven by a separate mechanical prime mover for each machine.

One object of the invention is the provision of a compact, easily assembled machine of the character named wherein the movable parts are driven by power applied close to the point of operation and by mechanism which runs with a minimum of vibration and wear, while protected perfectly from water.

Another object of the invention is the provision of an improved means for removing the vegetables after they have been peeled.

Another object of the invention is the provision of means whereby a machine of the character described driven by an electric motor may be conveniently lubricated and wherein waste oil is so disposed of as to be incapable of reaching the motor.

A preferred embodiment of my invention is illustrated in the accompanying drawings, wherein—

Figure 1 is a vertical median section of the body of my machine, Fig. 2 is a front view of the same with the bottom of the legs removed, Fig. 3 is a plan view thereof with the upper casing removed, Fig. 4 is an elevation of the pan thereof, with a portion of its wall removed, Fig. 5 is a side view of the discharging mechanism with the chute shown in section, Fig. 6 is a plan view of the fixed portion of the door fastener, and Fig. 7 is a plan view of the gears.

My present invention comprises improvements in the type of machine shown and claimed in my earlier United States patent granted December 14th 1909, No. 942,932. The revoluble abrading member 10, is mounted upon a short shaft or stem 11, which turns within the vertical hollow boss 12, rising from the center of the bottom of the pan 13 wherein the peelings and water are caught as described in my aforesaid patent. I prefer to provide a chamber 14 at the bottom of the hollow in the boss 12 wherein superfluous oil may be caught.

Fixed to the shaft 11 immediately below the abrading member 10 is a large gear wheel 15 which engages a pinion 16 on a vertical shaft 17 passing through a second hollow boss 18 on the upper face of the bottom of the pan and also through a depending hollow boss 19 beneath the pan. The bosses 18 and 19 provide a long bearing for the shaft 17 extending down to the beveled pinion 20 which is driven by the pinion 21 on the driving shaft of the electric motor 22. Other driving means may be employed without departing from my invention.

The arrangement described by providing a bearing extending all the way from the pinion 20 to the pinion 16, insures the utmost solidity and strength, and protects the shaft and its bearing from access of the water caught by the pan 13. Further protection is afforded by the casing 23, which entirely surrounds the gears 15, 16, fitting snugly over the bearing bosses 12 and 18. I prefer to supply the casing 23 with a top plate or cover 24, screwed in place as shown at 25, and having a suitable opening 26 for passage of the shaft which carries the abrading member 10.

For the purpose of lubricating the shafts 11 and 17, I provide a cup or trough 27 outside of the pan which communicates by the pipes 28, 29, with the bearings 12 and 18 respectively. In order to prevent any oil from dripping down the shaft 17 and being carried to any part of the motor 22, I prefer to provide the pinion 20 with an annular flange 30 which surrounds a corresponding shoulder on the end of the bearing 19 and confines any oil which may descend to this point. I also prefer to provide a bushing 31 which fits over the end of the shaft 17, and over which I fit a nozzle 32. This nozzle leads through an opening 33 to a point outside of the sheet metal casing 34 which incases the motor 22 and fits inside of an annular flange 35 depending from the outer edge of the pan 13. By this means superfluous oil is surely conducted to the exterior of the machine, thus preventing all accumulation within the lower casing.

As shown in Figs. 1 and 4, the bottom of the pan 13 has a central circular horizontal portion made flat underneath for the better attachment of the top of the motor 22. Around this horizontal portion of the pan the bottom slopes outward beginning at the highest point on one side, at 36, and becoming steeper continually (as shown at 37, Fig. 4) in each direction around the circle. By this means the water which falls from the revolving abrading member 10 is led to the depression 38 which opens into a discharge pipe 39. The container 40, which confines the vegetables, rests with its edge upon that of the pan 13, being preferably held in place by the pivoted bolts 41 and ears 42. Between appropriate bearing lugs 43 the arm 44 is carried upon a shaft 45, adapted to turn in said bearings. The door 46 is fixed upon the arm 44 and, when lowered, closes an appropriate opening in the side of the container through which the vegetables may be discharged. In front of this opening is placed the chute 47, which is downwardly curved, as shown in Fig. 5, so as to direct the vegetables into any convenient receptacle, and prevent scattering of the vegetables and water. To make it possible to conveniently raise the door 46 I employ a handle-lever 48 fixed to one end of the shaft 45 and carrying near its lower extremity the spring latch 49, having a depending finger piece 50 whereby it may be disengaged from the hook 51. This hook is preferably carried on a slotted plate 52, sliding on a lug 53 fixed to the side of the machine. The plate 52 may be fixed in a given position for adjustment by the set screw 54.

As shown in Fig. 5, the upper portion of the chute 47 is open at 55, and this space is occupied by the raised door when the vegetables are discharged.

Any convenient sprinkling means for the water may be employed in a manner usual in devices of this character and I have shown in Fig. 1 a sprinkling pipe entering at 100.

Various changes may be made in the construction of this machine without departing from the scope of my invention, and I do not limit myself to the details herein shown and described.

What I claim is—

1. A machine of the class described comprising in combination a rotating member, a water-diverting pan beneath said member having a horizontal bottom portion and a water-shedding bottom portion sloping downwardly and outwardly, the under surface of said bottom portion having a flat portion, a motor attached to the flat portion of said under surface, and power transmitting means extending from said motor upwardly through said bottom pan to said rotating member, substantially as described.

2. A machine of the class described comprising in combination a water-diverting pan having a substantially central boss extending upward therefrom and also having a second upwardly extending boss, a rotating member having a shaft adapted to rotate within said central boss, a gear wheel on said shaft, a shaft having a bearing in said second named boss and having a pinion engaging said gear wheel, and a motor operatively connected with said second named shaft, said motor being attached below said pan, substantially as described.

3. In a machine of the class described, a rotating member a water-diverting pan beneath the same, speed reducing gearing above said pan and below said rotating member, a protective casing surrounding said gearing to protect the same from water, a driving shaft for said gearing traversing the bottom of said pan, and a motor attached to the machine below said pan bottom and operatively connected with said driving shaft, substantially as described.

4. In a machine of the class described, a water-shedding pan having a substantially central upwardly extending boss and an eccentrically placed upwardly extending boss, a rotating member above said pan bottom, a shaft on said member carrying a gear wheel and having a bearing in said central boss, a shaft passing through said eccentric boss carrying a pinion engaging said gear wheel, a protective casing around said gear wheel and pinion, and a motor attached to the machine below said pan bottom, and operatively connected with said second named shaft, substantially as described.

5. In a machine of the class described, a water-diverting pan, a member arranged to rotate above the same, a boss extending upward and downward from the bottom of said pan and bored from end to end, a driving shaft arranged to rotate within said bored boss, a motor below said pan bottom operatively connected with said shaft, and driving connections between said shaft and said rotating member, substantially as described.

6. In a device of the class described wherein water is sprinkled for flushing purposes and oil is supplied for lubrication, a water-diverting pan, a member arranged to rotate above the same, a motor attached to the machine below said pan, a casing surrounding said motor, a bored boss extending upward and downward from the bottom of said pan, a driving shaft adapted to turn in the bore of said boss and operatively connected to said rotating member and to said motor, and an oil-conducting nozzle extending from the lower end of said shaft to a point outside of said casing, substantially as described.

HENRY ROBINSON.

Witnesses:
H. S. MacKaye,
Katharine Mead.